United States Patent

[11] 3,601,411

[72] Inventor Claude Raymond Bourgeois
  Annecy, France
[21] Appl. No. 757,900
[22] Filed Sept. 6, 1968
[45] Patented Aug. 24, 1971
[73] Assignee Societe Nouvelle de Roulements
  Annecy (Haute Savoie), France
[32] Priority Sept. 7, 1967, Dec. 7, 1967
[33] France
[31] 120,260 and 131,385

[54] SEALS FOR ROLLING-CONTACT BEARINGS
  4 Claims, 10 Drawing Figs.
[52] U.S. Cl. .................................................. 277/82
[51] Int. Cl. ................................................ F16j 15/34
[50] Field of Search .......................................... 277/82, 83,
  95, 25, 235

[56] References Cited
UNITED STATES PATENTS
| 3,086,781 | 4/1963 | Hudson et al. | 277/82 X |
| 3,159,407 | 12/1964 | Strohm | 277/82 |
| 3,266,269 | 8/1966 | Stokely | 277/95 X |
| 3,311,430 | 3/1967 | Christensen et al. | 277/95 X |
| 3,479,840 | 11/1969 | Meyers | 277/95 X |

FOREIGN PATENTS
| 1,071,374 | 8/1954 | France | 277/95 |
| 918,815 | 2/1963 | Great Britain | 277/95 |

Primary Examiner—Robert I. Smith
Attorney—Stevens, Davis, Miller & Mosher

ABSTRACT: Seal for rolling-contact bearings, characterized by the combination of a resilient seal mounted on the outer race with a deflector member mounted on the inner race or any adjacent surface with which the sealing lip of said seal is in smooth sliding or frictional contact.

SEALS FOR ROLLING-CONTACT BEARINGS

This invention relates to seals for rolling contact bearings, whether of the ball- or roller type.

Seals for rolling-contact bearings are already known which have a substantially annular configuration and consist of one or more lips resiliently engaging the inner race of the bearing. Devices affording a rough protection are also known which comprise deflectors fitted in a groove formed in one of the bearing races, and forming a narrow gap with the other race.

The present invention constitutes a specific combination of these two general modes of protection, which aims at eliminating the inconveniences of the deflector type while taking the maximum advantage from its possibilities by associating it with a rubber seal or a member made from a material having similar properties. In the drawing.

Figure 1:
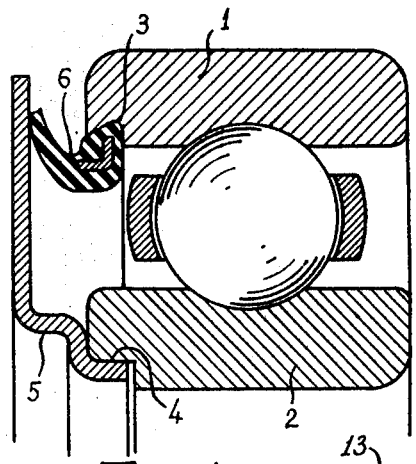
FIG. 1 illustrates in fragmentary radial section a ball bearing provided with the sealing means of this invention.

Referring first to FIG. 1 of the drawing it will be seen that the rolling-contact bearing illustrated therein is of conventional design and comprises an outer race 1 and an inner race 2. These races are machined to provide respectively an annular recess 3 on the outer race to permit the fitting of the seal proper 6, and another annular recess 4 of different configuration on the inner race for fitting the deflector member 5. This deflector member 5 is force-fitted in its recess 4. The seal 6 is in smooth frictional or sliding contact with the inner face of the flange portion of deflector member 5, due to the inherent elasticity of this seal.

Figure 2:
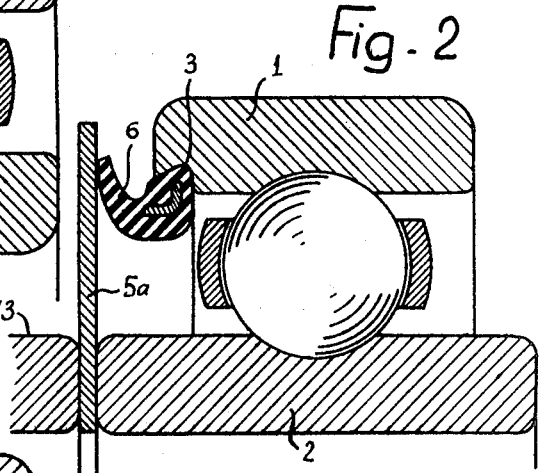
FIG. 2 illustrates a modified form of embodiment of the method of fastening or fitting the deflector member.

FIG. 2 illustrates a modified form of embodiment wherein the deflector member 5a is clamped between the inner race of the bearing (which in this example is slightly wider) and an adjacent member 13.

Figure 3:
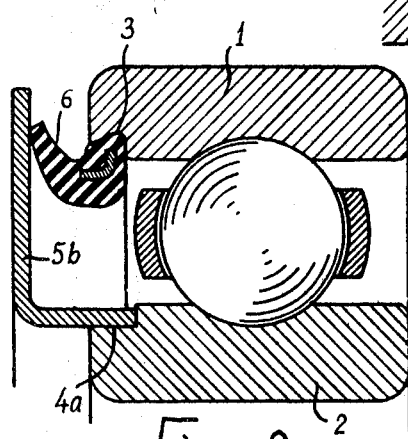
FIGS 3 and 4 illustrate other modified forms of embodiment of the deflector member fastening method.
Figure 4:
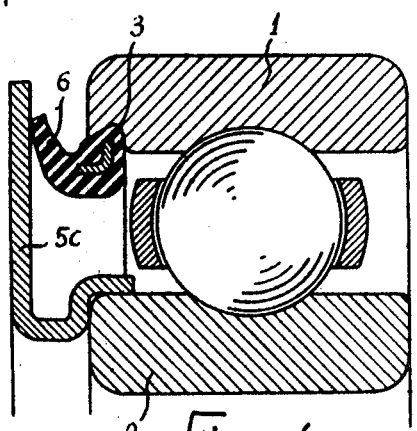

In the case illustrated in FIG. 3 which shows a simple modification of the construction of FIG. 1 the deflector-receiving recess 4a is formed in the outer diameter of the inner race to receive deflector member 5b. The machining of this recess may even be dispensed with by shaping the deflector member 5c in a manner to permit the proper fitting thereof, as illustrated in FIG. 4.

Figure 5:
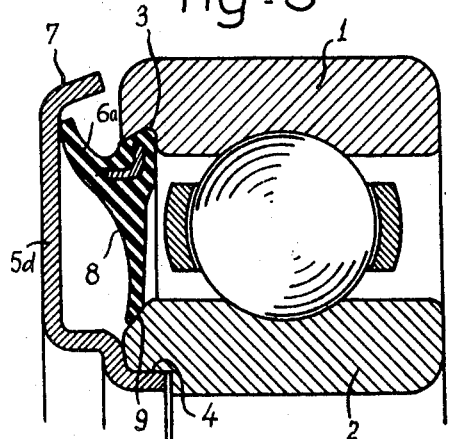
FIG. 5 illustrates an improvement in the protection of the deflector associated with the seal already shown in the preceding Figures, but completed by a conventional-type lip.

In the alternate form of embodiment shown in FIG. 5, the outer edge 7 of the flange-forming portion of deflector member 5d is bent towards the bearing in order to constitute in conjunction with the seal 6a a kind of labyrinth. Moreover, the seal 6a is here provided with an additional inner lip 8 of conventional design which engages a face 9 formed on the inner race.

Figure 6:
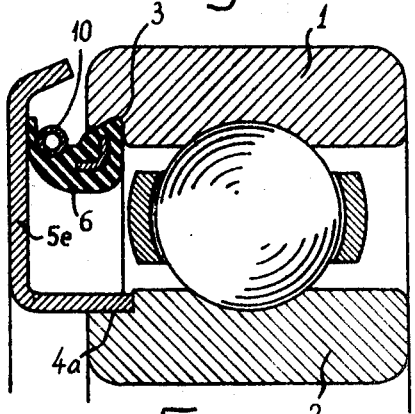
FIG. 6 illustrates another modification of the sealing means.

In the example illustrated in FIG. 6 the sealing action is improved by increasing the resilient pressure exerted by the seal on the deflector by means of an annular coil spring 10 of a type known per se.

Figure 7:
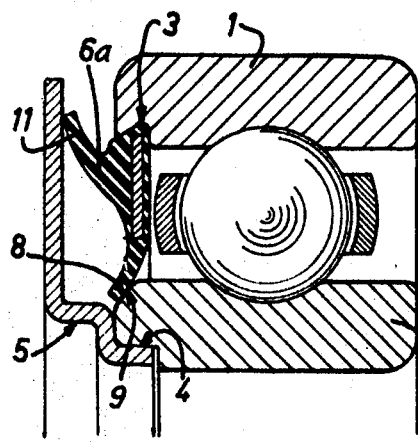
FIGS 7, 8, 9 and 10 are modified forms of embodiment of the sealing means of FIGS 1, 2 and 6 inclusive.

In the modified form of embodiment shown in FIG. 7 the component elements of FIG. 1 comprising the races 1 and 2, deflector member 5 are shown together with seal 6a of FIG. 5 which has two sealing lips, i.e. an outer lip 11 in smooth frictional or sliding contact with the inner face of the deflector flange and an inner lip 8 engaging a face 9 suitably formed on the inner race 2.

Figure 8:
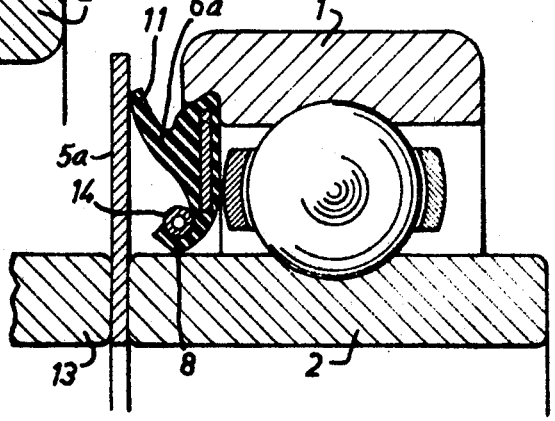

In FIG. 8 a modification of the structure shown in FIG. 2 is contemplated and the deflector member is clamped between the wider inner race 2 and an adjacent member 13. The outer lip 11 of seal 6a engages the deflector member 5a and comprises an inner lip 8 engaging the inner race 2; but the efficiency of this sealing arrangement is further improved by using a spring 14 resiliently urging this inner lip 8 against the inner race 2.

Figure 9:
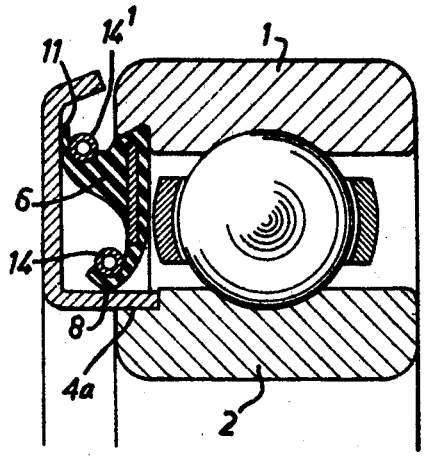

In the modified form of embodiment of FIG. 9, constituting a variation of the structure of FIG. 6, the seal 6a comprises two lips 8 and 11 of which the sealing action is reinforced by the provision of annular coil springs 14 and 14'.

Figure 10:
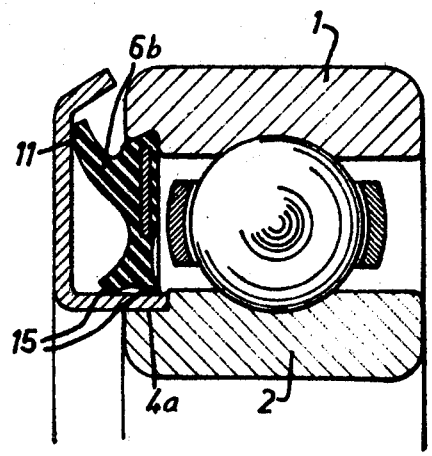

Referring now to FIG. 10, it will be seen that this modification of the construction of FIG. 9 comprises a seal 6b having a double inner lip 15 engaging the outer face of the inner annular portion of the deflector member at the level of its recess in the race 2, but no spring is provided for reinforcing the sealing action of these lips.

This invention is also applicable to all cases wherein the deflector member is mounted on the outer race and the seal on the inner race of the bearing.

Furthermore, it will readily occur to anybody conversant with the art that these improvements in sealing devices for rolling-contact bearings are also applicable to seals between a fixed member and a rotary member.

I claim:

1. A sealing device for rolling-contact bearings having inner and outer races comprising a resilient seal having inner and outer lips, an annular recess formed in the inner surface of said outer race and receiving said seal therein, a deflector member mounted on said inner race, said outer lip in constant smooth sliding frictional contact with said deflector member and said inner lip contacting said inner race.

2. A sealing device according to claim 1 further comprising at least one annular coil spring mounted to bias an associated lip into its sealing position.

3. A sealing device according to claim 1 further comprising an annular coil spring mounted to bias each of said lips into its sealing position.

4. A sealing device according to claim 1 wherein said inner lip further comprises a double lip engaging said inner race.